(12) United States Patent  
Wishart

(10) Patent No.: US 6,594,910 B2
(45) Date of Patent: Jul. 22, 2003

(54) APPARATUS FOR AND A METHOD OF PROVIDING A REFERENCE POINT OR LINE

(76) Inventor: James Scott Wishart, 14 Forthill Road, Broughty Ferry, Dundee DDS 3DG (GB)

(*) Notice: Subject to any disclaimer, the term of this patent is extended or adjusted under 35 U.S.C. 154(b) by 19 days.

(21) Appl. No.: 09/738,019

(22) Filed: Dec. 15, 2000

(65) Prior Publication Data

US 2002/0017028 A1 Feb. 14, 2002

(30) Foreign Application Priority Data

Dec. 16, 1999 (GB) .............................................. 9929618

(51) Int. Cl.⁷ .............................................. G01C 15/00
(52) U.S. Cl. ..................... 33/286; 33/281; 33/DIG. 21
(58) Field of Search ......................... 33/286, 285, 283, 33/282, 281, 296, DIG. 21, 809, 392

(56) References Cited

U.S. PATENT DOCUMENTS

| | | | | |
|---|---|---|---|---|
| 342,303 A | * | 5/1886 | Morrison ...................... | 33/392 |
| 688,952 A | * | 12/1901 | Janssen ........................ | 33/392 |
| 753,354 A | * | 3/1904 | Brown ......................... | 33/392 |
| 1,500,639 A | | 7/1924 | Rekar | |
| 2,206,530 A | | 7/1940 | Duren ......................... | 33/217 |
| 2,245,646 A | * | 6/1941 | Bullivant ..................... | 33/392 |
| 3,277,579 A | * | 10/1966 | Murphy ........................ | 33/372 |
| 3,328,887 A | * | 7/1967 | Wright ......................... | 33/392 |
| 3,522,658 A | * | 8/1970 | Howell ........................ | 33/286 |
| 3,606,713 A | * | 9/1971 | Runquist ...................... | 33/286 |
| 3,638,325 A | | 2/1972 | Petrik ......................... | 33/216 |
| 3,709,617 A | * | 1/1973 | Rascioni et al. .............. | 33/281 |
| 3,775,929 A | * | 12/1973 | Roodvoets et al. ............ | 33/286 |
| 3,922,969 A | * | 12/1975 | Tyler et al. ................... | 33/287 |
| 4,142,798 A | * | 3/1979 | Barbee, Jr. .................... | 33/286 |
| 4,183,667 A | * | 1/1980 | Denton ........................ | 356/250 |
| 4,202,108 A | * | 5/1980 | Adams, Jr. et al. ............ | 33/281 |
| 4,458,868 A | * | 7/1984 | Hess ........................... | 359/822 |
| 4,509,263 A | * | 4/1985 | Andrie et al. .......... | 33/DIG. 21 |
| 5,505,000 A | * | 4/1996 | Cooke .......................... | 33/286 |
| 5,758,448 A | * | 6/1998 | Thummel ...................... | 42/103 |
| 5,842,282 A | * | 12/1998 | Ting ............................ | 33/282 |
| 6,087,645 A | * | 7/2000 | Kitajima et al. ........ | 33/DIG. 21 |
| 6,256,895 B1 | * | 7/2001 | Akers .......................... | 33/286 |
| 6,438,854 B1 | * | 8/2002 | Kott, Jr. ...................... | 33/286 |

FOREIGN PATENT DOCUMENTS

| | | | |
|---|---|---|---|
| FR | 2 684 496 A1 | 6/1993 | |
| JP | 63279113 A | * 11/1988 | .................. 33/281 |
| WO | 98/58232 | 12/1998 | |
| WO | 99/35465 | 7/1999 | |

OTHER PUBLICATIONS

Patent Abstracts of Japan; Publication No. 61262611 dated Nov. 20, 1986; Appli. No. 60102677 dated May 16, 1985; Applicant: Fujita Corp.; Inventor: Sugihara Shigeki; Title: Automatic Marking Apparatus Utilizing Laser.

* cited by examiner

*Primary Examiner*—Diego Gutierrez
*Assistant Examiner*—Mirellys Jagan
(74) *Attorney, Agent, or Firm*—Drinker Biddle & Reath LLP

(57) ABSTRACT

A level apparatus is disclosed that includes a body mounted on an elongate member. The body typically includes a laser that is capable of rotation about horizontal and/or vertical axes. The elongate member can be braced between, for example, a floor and a ceiling and the body is typically capable of longitudinal movement along an axis that is substantially parallel to a longitudinal axis of the elongate member. Movement of the body and other functions of the apparatus can be remote controlled.

36 Claims, 4 Drawing Sheets

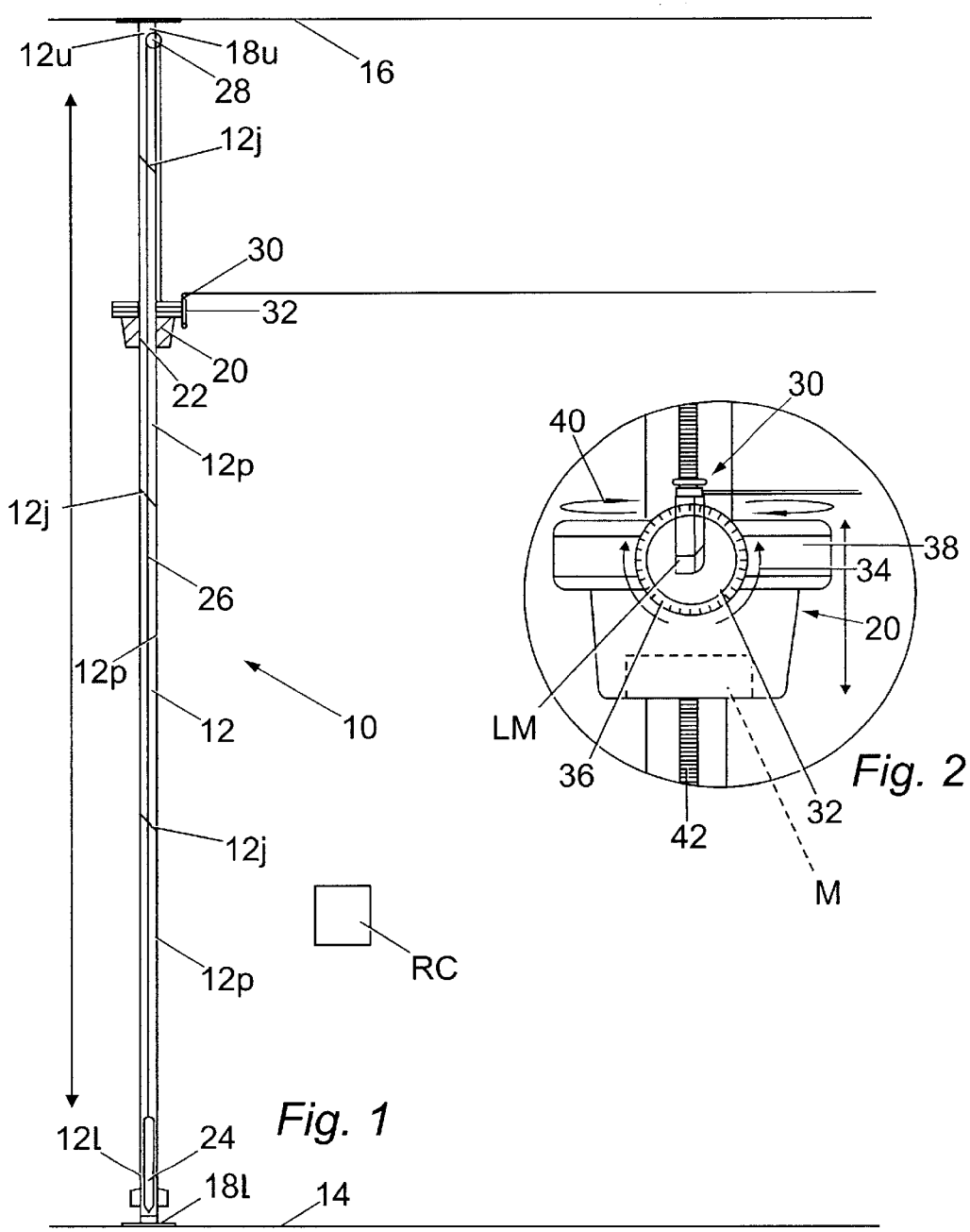

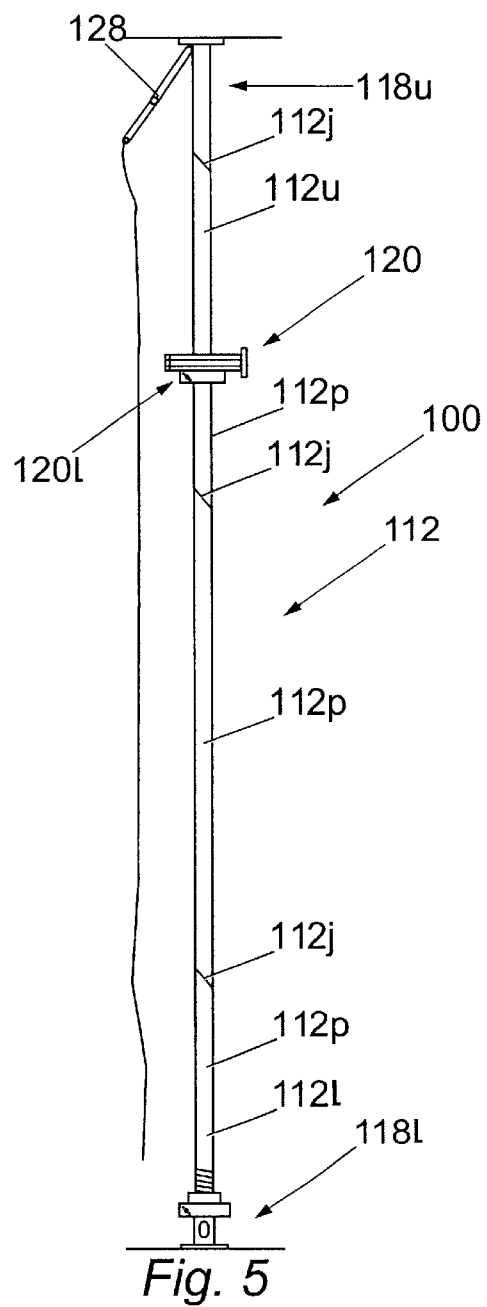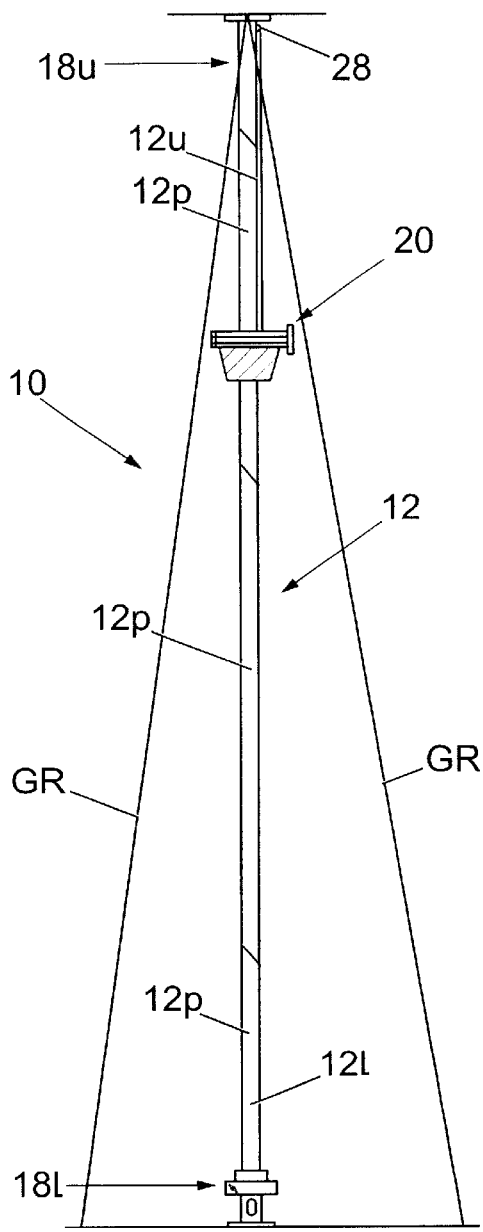
Fig. 5
Fig. 4

APPARATUS FOR AND A METHOD OF PROVIDING A REFERENCE POINT OR LINE

The present invention relates to apparatus for and a method of providing a reference point or line, and more particularly, but not exclusively, to apparatus and a method that incorporates a laser.

DESCRIPTION OF THE RELATED ART

It is known to incorporate lasers into apparatus that can provide reference points (e.g. levels, plumb lines etc) such as plumb levels. Plumb levels are used particularly in the building trade to establish straight lines for brickwork, plumb points for wall corners and various other functions.

The design and configuration of conventional apparatus incorporating lasers varies, but generally they require some form of tripod stand for support or alternatively some surface on which they are placed. Once placed on the surface or on the tripod, the apparatus requires to be levelled either manually or automatically using various adjustment mechanisms.

The operation of conventional apparatus is limited due to the limitations of a tripod stand or other surface upon which the apparatus rests. It is often required to provide levels at various heights, and the conventional mounting of the apparatus cannot always be used as its height variability is limited. Where tripod stands are used, the tripods are limited by their size and extension capabilities and generally do not have the capability of being extended to allow the apparatus to be positioned at or near a ceiling, particularly in rooms with high ceilings. Additionally, where the apparatus merely rests on a surface, height adjustment is dependent on having a suitable surface at the correct height, which is not always possible.

Additionally, conventional apparatus requires a user to adjust the height either by manually moving the apparatus to a different surface, or by manually adjusting the height of the tripod or other stand. This can be a time-consuming process particularly where the user is working up a ladder or on scaffolding for example, and has to climb down before manually adjusting the apparatus, and then climb up again.

Furthermore, conventional apparatus typically does not provide for a full range of motion i.e. they normally allow for 360° rotation about a vertical axis, but do not provide for 360° rotation about a horizontal axis.

BRIEF SUMMARY OF THE INVENTION

According to a first aspect of the present invention, there is provided apparatus for providing a reference point or line, the apparatus comprising a body and an elongate member having a longitudinal axis, the body having a laser and being capable of movement substantially parallel to the longitudinal axis of the elongate member.

According to a second aspect of the present invention, there is provided a method of providing a reference point or line, the method comprising the steps of providing a body and an elongate member having a longitudinal axis, the body having a laser and being capable of movement substantially parallel to the longitudinal axis of the elongate member; securing the elongate member in a substantially vertical orientation; positioning the laser at a pre-selected position on the elongated member; and actuating the laser.

The elongate member is typically adapted to be fixed to a support. The elongate member is typically provided with a first bracket for engaging a first supporting surface or structure. The elongate member is typically also provided with a second bracket for engaging a second supporting surface or structure.

The elongate member is typically provided with adjustment means to facilitate adjustment of the length of the elongate member. The adjustment means typically comprises a telescopic or sliding portion of the elongate member. The adjustment means typically includes a locking means. The locking means typically comprises a locking collar and a tightening sleeve.

Optionally, the elongate member can be adapted to be held using one or more guy ropes attached to the member.

The elongate member preferably comprises two or more portions that are coupled together. The portions are typically of different lengths. Thus, different portions having different lengths can be coupled together so that the elongate member can be braced between the first and second surfaces or structures. The length of the elongate member can be adjustable in use, and this can be achieved by providing a second telescopic portion or sliding pole portions either side by side or concentrically.

The elongate member preferably has a counterweight attached thereto. The counterweight is typically suspended from a plumb line. The plumb line is typically attached at a first end thereof to the body, and at a second end thereof to the counterweight. The plumb line typically passes through or over a pulley provided at an end of the elongate member. The body can optionally be moved substantially parallel to the elongate member by varying the length of the plumb line. The counterweight is typically used to ensure that the elongate member is plumb before and/or during use.

The elongate member is typically provided with a bore in which the plumb line and/or the counterweight can be located. The counterweight can engage a portion of the elongate member.

The body can move relative to the elongate member itself, or can be fixed in relation to one of the portions of the elongate member and can be moved along the axis of the elongate member by moving the location of the portion within the member.

The movement of the body substantially parallel to the longitudinal axis of the elongate member can be remotely controlled.

The body is optionally provided with a motor and gear assembly to move the body substantially parallel to the longitudinal axis of the elongate member. The elongate member is optionally provided with engagement means for engagement with the motor and gear assembly provided on the body.

The laser is typically capable of rotation about a first axis that is substantially parallel to the longitudinal axis of the elongate member. The laser is typically also capable of rotation about a second axis that is substantially perpendicular to the longitudinal axis of the elongate member. The laser can preferably rotate through 360° about the first and/or second axis. Thus, a light beam emitted by the laser can be directed in substantially any direction. Optionally, rotation of the laser about the first and/or second axis can be remotely controlled.

The laser can be interchangeable so that a number of different lasers can be used for different functions. Alternatively, two or more different lasers can be provided that are capable of being operated independently of one another. Optionally, the or each laser can be remotely controlled so that they can be remotely interchanged or operated.

The laser is typically mounted to the body using a swivel. The laser is typically mounted to the swivel using a mounting plate, the mounting plate being capable of rotation about an axis that is substantially perpendicular to the longitudinal axis of the elongate member. The mounting plate is typically capable of 360° rotation about the axis.

Optionally, the mounting plate is provided with indication means. The indication means typically comprises a plurality of lines indicating angular positions of the laser relative to the pole or plate. The mounting plate and/or the body are typically provided with a locking means to lock the laser at a certain angle.

The elongate member is typically secured in a substantially vertical orientation by bracing it between first and second surfaces or structures.

The first surface typically comprises a ceiling, and the second surface typically comprises a floor The method typically includes the additional step of adjusting the adjustment means so that the elongate member is braced between the first and second surfaces or structures.

The method optionally includes the additional steps of providing one or more guy ropes and attaching these to the elongate member to secure the elongate member in a substantially vertical orientation.

The method typically includes the additional steps of coupling the portions together to form the elongate member.

The method typically includes the additional step of attaching the plumb line at a first end thereof to the body, and at a second end thereof to the counterweight.

The method typically includes the additional step of adjusting the orientation of the elongate member so that it is plumb by using the counterweight as a reference.

The method optionally includes the additional step of varying the length of the plumb line to move the body substantially parallel to the elongate member to set the laser at a pre-selected height.

The method typically includes the additional steps to rotating the laser about the first and/or second axis to direct the laser at a pre-selected angle.

The method optionally includes the additional steps of removing the laser from the body and replacing with another laser.

BRIEF DESCRIPTION OF THE SEVERAL VIEWS OF THE DRAWINGS

Embodiments of the present invention shall now be described, by way of example only, with reference to the accompanying drawings, in which:

FIG. 1 is a cross sectional elevation of apparatus according to the present invention;

FIG. 2 is an enlarged view of part of the apparatus of FIG. 1;

FIG. 4 is a side elevation of the apparatus of FIGS. 1 to 3;

FIG. 5 is a side elevation of a second embodiment of apparatus; and

DETAILED DESCRIPTION OF THE INVENTION

Figure 3:
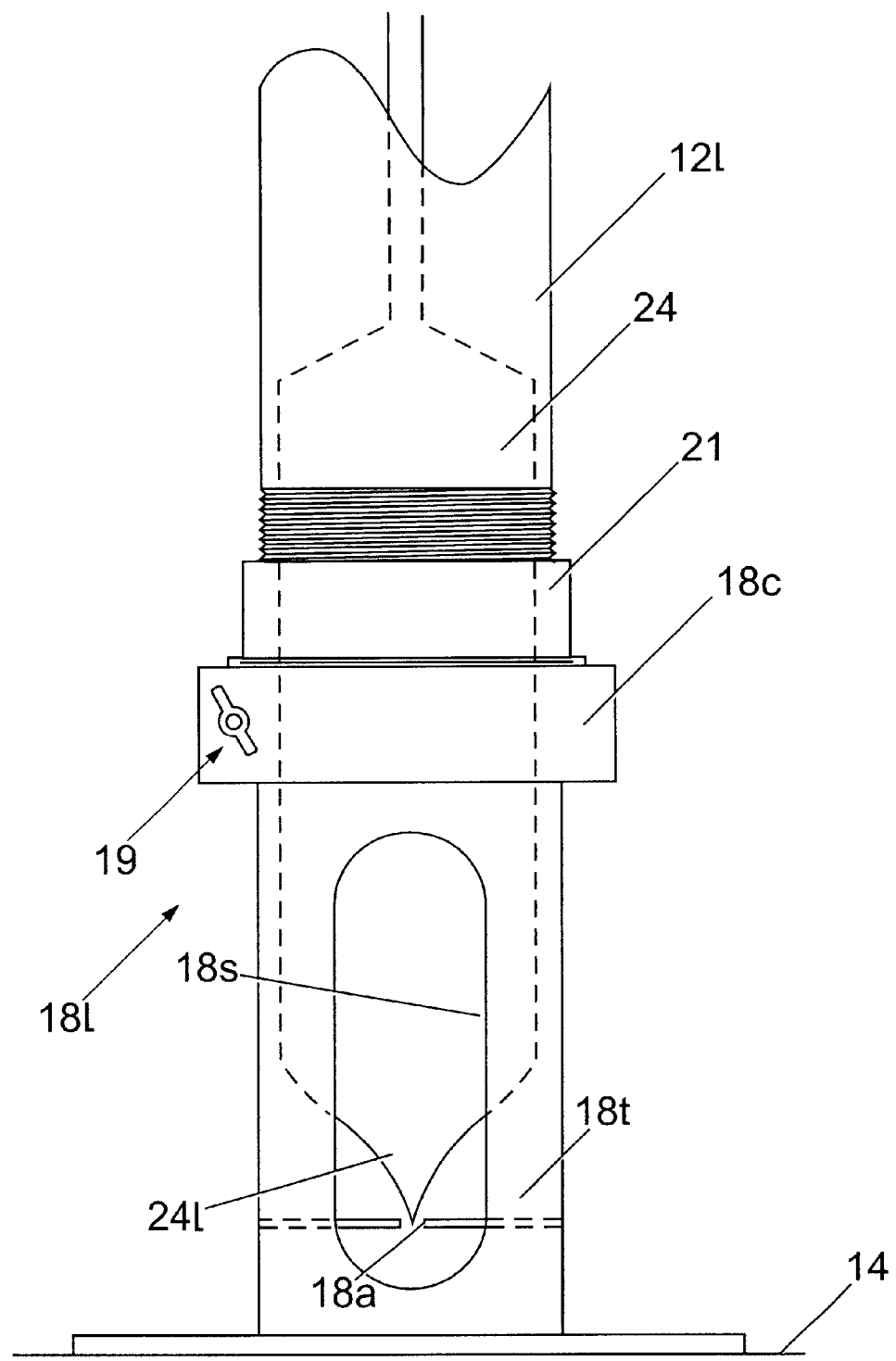
FIG. 3 is a further enlarged view of part of the apparatus of FIG. 1.

Referring to the drawings, FIGS. 1 and 4 show a first embodiment of apparatus for providing a reference point or line, generally designated 10, according to the present invention. FIG. 1 shows a cross-sectional elevation and FIG. 4 shows a side elevation of the apparatus 10. Apparatus 10 includes an elongate member (e.g. a pole 12) that advantageously comprises a plurality of portions 12p. Portions 12p are coupled together, typically by screw threads at junctions 12j. Different lengths of portions 12p can be used so that the overall length of pole 12 can thus be varied. This allows the pole 12 to be positioned (and thus supported) between a floor 14 and a ceiling 16, for example. It should be noted that the pole 12 may be supported using any conventional means. The pole portions 12p can be fixed together in a particular embodiment for use at a particular height, but it is preferred that the length of a pole 12 can be varied by using different lengths of individual portions 12p. Alternatively, the length of pole 12p may be adjusted by collapsing or extending pole portions 12p relative to one another. Thus, the pole 12 can be disassembled for more compact storage and easier transportation and can then be assembled to any length, depending upon the lengths of portions 12p.

It should be noted that the portions 12p may be coupled using any conventional means, such as a pin provided on one end of a portion 12p that engages in an aperture on the end of a successive portion 12p. The portions 12p may also be telescopically coupled together Apparatus 10 includes a body 20 that is attachable to the pole 12 and can move substantially parallel to the longitudinal axis of the pole 12. For example, body 20 may be provided with a central aperture 22 through which the pole 12 may pass, thus allowing the body 20 to slide longitudinally along the pole 12.

In the embodiment shown in FIGS. 1 and 4, the body 20 is provided with a motor and gear assembly M that engages the pole 12, typically using a track 42 (FIG. 2). The motor and gear assembly M can be remotely controlled so that the body 20 can be moved up and down the pole 12 using the motor and gear assembly M. The motor and gear assembly M may be activated using a remote controller RC that may be hard-wired to the body 20, or preferably communicates with the body 20 using infra-red or the like.

Alternatively, a drive mechanism can be provided on the pole 12 (such as a belt or chain with a pulley arrangement at the pole ends) so that the body 20 can be pulled along the pole axis.

Activating the motor and gear assembly M allows the vertical displacement of the body 20 to be adjusted to different heights without any manual adjustment. This is advantageous where the user is located up a ladder or on scaffolding for example.

A counterweight 24 (or plumb bob) is used to balance the weight of the body 20 and is attached thereto using a plumb line 26. Line 26 is tied at a first end to the counterweight 24 and at a second end to the body 20. The line 26 is located in a bore 12b extending through the portions 12p (i.e. it is located within the pole 12) and also passes around a pulley 20 located at or near the upper end 12u of the pole 12.

The upper and lower ends 12u, 12l of the pole 12 may each be provided with a bracket 18u at the upper end 12u and a bracket 18l at the lower end 12l of the pole 12, the brackets 18u, 18l facilitating engagement with the ceiling 16 and floor 14, respectively. Referring to FIG. 3, there is shown an enlarged view of the lower portion 12l of the pole 12. The bracket 18l includes a viewing slot 18s that allows a user to see the counterweight 24 (shown in dotted outline in FIG. 3). The pole 12 should be plumb when the counterweight 24 is located in an aperture 18a within bracket 18l.

It will be appreciated that bore 12b through each portion of pole 12 is typically a throughbore, but it will also be appreciated that the bore 12b at the ends 12u, 12l of the pole 12 will be blind bores. That is, the bores 12b at the ends 12u, 12l will be closed at these ends because of brackets 18u, 18l.

Bracket 18l is further provided with a telescopic portion 18t that facilitates adjustment of the height of the bracket 18 so that the pole 12 can extend between the floor 14 and the ceiling 16. It will be appreciated that a portion of the pole 12 can be provided with a telescopic portion in addition or in the alternative to portion 18t on the bracket 18l. Also, a telescopic portion may alternatively or additionally be provided on the upper bracket 18u. Thus, the telescopic portion 18t facilitates fine adjustment of the height of pole 12 so that pole 12 fits securely between the floor 14 and ceiling 16. Bracket 18l includes a locking collar 18c that is slidably engaged with the lower portion 12l of the pole 12, and is used to lock the height of the telescopic portion 18t. The locking collar 18c is typically held in place using, for example, a locking bolt and nut, generally designated 19. A tightening sleeve 21 is threadedly attached to the lower portion 12l of pole 12, and abuts against the locking collar 18c to prevent axial movement thereof.

In use, the tightening sleeve 21 is slackened by rotating it in a first direction. The locking bolt and nut 19 is then slackened to allow for movement of the telescopic portion 18t. The telescopic portion 18t is then set to the required height and the locking nut and bolt 19 tightened. The tightening sleeve 21 is then brought into abutment with the locking collar 18c and rotated in a second direction, typically opposite to the first direction, to prevent axial movement of the locking collar 18c.

In use, the portions 12p are coupled together to provide a pole 12 that typically extends between the floor 14 and ceiling 16. The body 20 is located on the pole 12 before the pole 12 is braced between the floor 14 and ceiling 16. Where the apparatus 10 is being used outdoors, or where the pole 12 cannot be braced between a floor and ceiling, guy ropes GR may be used, attached at or near the upper end 12u of the pole 12, to stabilise the pole 12 during use. It will be appreciated that the pole 12 can be braced between any two spaced-apart surfaces that are generally parallel to one another (that is, it need not be braced between the floor and the ceiling). Also, guy ropes GR may be used and coupled to the pole 12 even when the pole 12 is braced between the floor 14 and the ceiling 16.

The plumb line 26 is tied to the body 12 and the counterweight 24 (plumb bob) is positioned at or near the lower end 12l of the pole 12, thus allowing the pole 12 to be adjusted so that it is plumb. As shown in FIG. 3, the counterweight 24 is located within the lower portion 12l of the pole 12 and is aligned with the aperture 18a in the bracket 18 in use. The slot 18s in the bracket 18l allows the user to check that the apparatus is plumb (i.e. that the counterweight 24 is engaged in the aperture 18a). The counterweight 24 is suspended on the plumb line 26 so that the lower portion 24l of the counterweight 24 is loosely engaged in the aperture 18a.

Once the apparatus 10 has been set plumb, the counterweight 24 remains in the aperture 18a in the bracket 18 so that it can be checked for accuracy during use.

Use of a plumb line 26 that extends the axial length of the pole 12 gives the apparatus 10 the potential to be more accurate as it is plumbed over a longer distance (e.g. 8 to 10 feet or 2.4 to 3 meters) than conventional apparatus.

Figures 6A, 6B, 6C:
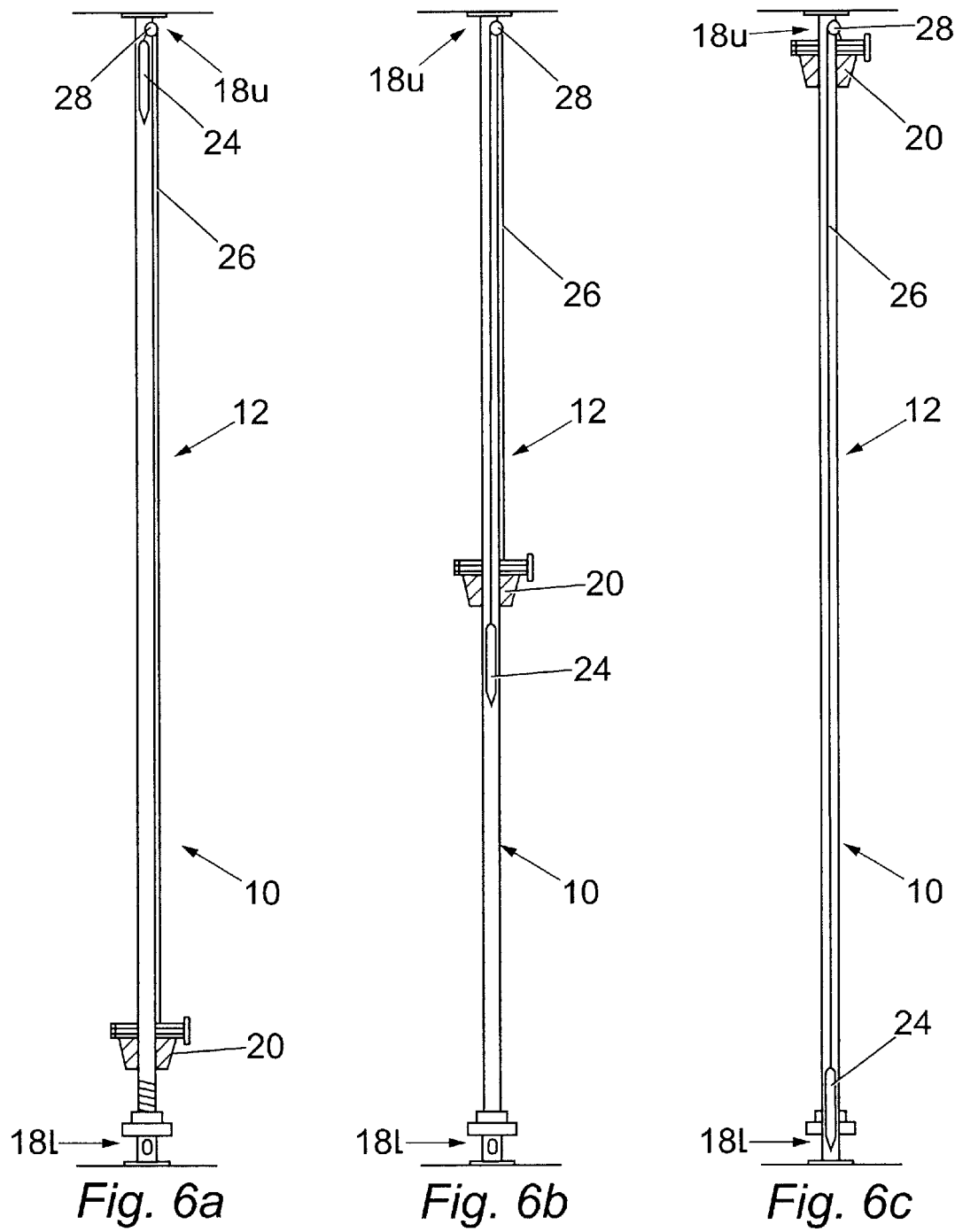
FIG. 6 is a plurality of cross-sectional views of the apparatus of FIG. 1 wherein a) shows a body at a lower end of a pole; b) shows the body at an intermediate position on the pole; and c) shows the body at the top of the pole.

Referring now to FIG. 6, there are shown views of the apparatus 10 with the body 20 a) at the bottom of the pole 12; b) in an intermediate position on the pole 12; and c) at an upper end of the pole 12. Once the apparatus 10 has been set plumb as described above, the counterweight 24 is used to balance the weight of the body 20. The counterweight 24 is pulled up to the upper end 12u of the pole 12 and the body 20 positioned at the lower end 12l of the pole 12 (as shown in FIG. 6a). The plumb line 26 is then attached to the body 20, typically by tying. The counterweight 24 is thus used to balance the body 20 and saves the motor and gear assembly M therein from wear during use. Additionally, the counterweight 24 will also help to reduce the drain on a battery or the like used to power the motor and gear assembly M, as the counterweight 24 aids in movement of the body 20 and thus reduces the amount of power drain from the battery.

If the apparatus 10 requires to be checked for accuracy (i.e. whether it is plumb), the body 20 is raised to the upper end 12u of the pole 12 (FIG. 6c) The counterweight 24 is thus located within the bracket 18u and the accuracy of the apparatus 10 can thus be checked and adjusted if required, as described above.

Referring particularly to FIG. 2, the body 20 includes a laser head 30. Laser head 30 includes a laser, such as a laser diode or the like, that is used to emit a beam of light. Laser light is very coherent, even after travelling long distances.

The laser head 30 is preferably interchangeable so that a variety of different types of lasers may be used for different purposes; that is one for longer distances, one for flat (horizontal) beams, etc. It will be appreciated that the laser head 30 can be changed so that the laser beam is a different colour. Thus, a first apparatus 10 can be used in the same vicinity as a second apparatus 10 for a different purpose without affecting one another by changing the colour of the beam. Alternatively, the laser head 30 may be provided with two or more lasers that can be operated independently of one another (e.g. they can be provided in a carousel-type arrangement). Thus, two or more different coloured or types of laser can be selected without having to change the laser head 30.

Laser head 30 is mounted to the body 20 using a mounting plate 32 to facilitate rotational movement thereof. The laser head 30 can be rotated around a substantially horizontal axis, as indicated by arrow 34. Plate 32 can be freely rotated so that the light emitted by the laser can define an arc or a circle, for example. Optionally, the laser head 30 can be tilted to allow for variations in the diameter of the circle, arc or the like. It will be appreciated that rotation of the laser head 30 about the horizontal axis may be remotely controlled (e.g. by providing the head 30 with a motor and/or gear assembly or the like).

Plate 32 is advantageously provided with indication means 36 allows a user to set the laser head 30 at angles between 0° and 360°. The indication means 36 preferably comprise radial lines that are spaced around the circumference of plate 32 at various angles. It is also advantageous for the plate 32 to include a locking means LM, e.g. a grub screw or the like, to allow the plate 32 to be set at a particular angle (e.g. 45°).

Plate 32 is mounted to body 20 using a swivel 38 that allows the laser head 30 to be rotated about a substantially vertical axis, as indicated by arrow 40. Swivel 38 preferably allows the head 30 to rotate freely so that the beam emitted by the laser can be used to provide a level on all surrounding walls. Swivel 38 may also be provided with a locking means (not shown) to prevent rotation thereof. Again, rotation of the swivel 38 and thus the laser head 30 about the vertical axis can be remotely controlled (e.g. by motorising the swivel 38).

The movement of body 20, and other functions of the apparatus 10, are preferably remotely controlled. Referring to FIG. 5 there is shown a second embodiment of apparatus 100. Apparatus 100 is similar to apparatus 10 (like features being designated with the same reference numerals pre-fixed "1"), but body 120 is configured for manual operation.

In the embodiment shown in FIG. 5, body 120 is provided with a locking means 120l, that may comprise a grub screw, nut and bolt or the like. The locking means 120l is tightened to lock the body 120 on the pole 112 at the required location. For example, where a grub screw is used, the screw is rotated until one end of the screw engages the pole 112, thus locking the body 120 in position. Alternatively, if a nut and bolt are used, the body 120 may be provided with a clamp (not shown) so that tightening of the nut and bolt tightens the clamp on the pole 112. The apparatus 100 is set up and used in a similar way as apparatus 10, and thus has the same advantages.

It should be noted that the mounting plate 32 and/or swivel 38 may be motorised. This would allow the plate 32 and/or swivel 38 to be rotated fast enough to facilitate a substantially continuous line to be shown on the wall surface or the like.

Modifications and improvements may be made to the foregoing without departing from the scope of the present invention.

I claim:

1. Apparatus for providing a reference point or line, the apparatus comprising a body connected to an elongate member having a longitudinal axis, the body having a laser and being capable of movement substantially parallel to the longitudinal axis of the elongate member, wherein the apparatus has a counterweight suspended from a plumb line, wherein the plumb line is attached at a first end thereof to the body, and at a second end thereof to the counterweight, the counterweight being used to adjust the orientation of the elongate member so that it is substantially vertical.

2. Apparatus according to claim 1, wherein the elongate member is adapted to be fixed to a support.

3. Apparatus according to claim 1, wherein the elongate member is adapted to be held using one or more guy ropes attached to the member.

4. Apparatus according to claim 1, wherein the counterweight engages a portion of the elongate member.

5. Apparatus according to claim 1, wherein the plumb line passes over a pulley provided at an end of the elongate member.

6. Apparatus according to claim 1, wherein the body can be moved substantially parallel to the elongate member by varying the length of the plumb line.

7. Apparatus according to claim 1, wherein the elongate member is provided with a bore in which the plumb line and the counterweight can be located.

8. Apparatus according to claim 1, wherein the movement of the body substantially parallel to the longitudinal axis of the elongate member can be remotely controlled.

9. Apparatus according to claim 1, wherein the laser is interchangeable so that a number of different lasers can be used for different functions.

10. Apparatus according to claim 1, wherein the counterweight comprises a plumb bob.

11. Apparatus according to claim 1, wherein the elongate member is provided with a first bracket for engaging a first supporting structure.

12. Apparatus according to claim 11, wherein the elongate member is provided with a second bracket for engaging a second supporting surface.

13. Apparatus according to claim 1, wherein the elongate member comprises two or more portions that are coupled together.

14. Apparatus according to claim 13, wherein the portions are of different lengths.

15. Apparatus according to claim 1, wherein the body is provided with a motor and gear assembly to move the body substantially parallel to the longitudinal axis of the elongate member.

16. Apparatus according to claim 15, wherein the elongate member is provided with engagement means for engagement with the motor and gear assembly provided on the body.

17. Apparatus according to claim 1, wherein the laser is capable of rotation about a first axis that is substantially parallel to the longitudinal axis of the elongate member.

18. Apparatus according to claim 17, wherein the laser can rotate through 360° about the first axis.

19. Apparatus according to claim 1, wherein the laser is capable of rotation about a second axis that is substantially perpendicular to the longitudinal axis of the elongate member.

20. Apparatus according to claim 19, wherein the laser can rotate through 360° about the second axis.

21. Apparatus according to claim 1, wherein the plumb line passes through a pulley provided at an end of the elongate member.

22. Apparatus according to claim 21, wherein the counterweight balances the weight of the body.

23. Apparatus according to claim 1, wherein the elongate member is provided with adjustment means to facilitate adjustment of the length of the elongate member.

24. Apparatus according to claim 23, wherein the adjustment means comprises a telescopic or sliding portion of the elongate member.

25. Apparatus according to claim 23, wherein the adjustment means includes a locking means.

26. Apparatus according to claim 25, wherein the locking means comprises a locking collar and a tightening sleeve.

27. Apparatus according to claim 1, wherein the laser is mounted to the body using a swivel.

28. Apparatus according to claim 27, wherein the laser is mounted to the swivel using a mounting plate, the mounting plate being capable of rotation about an axis that is substantially perpendicular to the longitudinal axis of the elongate member.

29. Apparatus according to claim 28, wherein the mounting plate is capable of 360° rotation about the axis.

30. Apparatus according to claim 28, wherein one of the mounting plate and the body is provided with a locking means to lock the laser at a certain angle.

31. Apparatus according to claim 28, wherein the mounting plate is provided with indication means.

32. Apparatus according to claim 31, wherein the indication means comprises a plurality of lines indicating angular positions of the laser relative to one of the pole and the mounting plate.

33. A method of providing a reference point or line for use in the construction industry, the method comprising the steps of:

providing a body connected to an elongate member having a longitudinal axis, the body having a laser and being capable of movement substantially parallel to the longitudinal axis of the elongate member, wherein the body has a counterweight suspended therefrom by a plumb line;

securing the elongate member in a substantially vertical orientation;

adjusting the orientation of the elongate member so that it is plumb using the counterweight as a reference;

positioning the laser at a pre-selected position on the elongated member; and actuating the laser.

34. A method according to claim 33, wherein the elongate member is secured in a substantially vertical orientation by bracing it between first and second surfaces.

35. A method according to claim 32, wherein the first surface comprises a ceiling.

36. A method according to claim 32, wherein the second surface comprises a floor.

* * * * *